(12) United States Patent
Pemberton-Pigott

(10) Patent No.: US 9,223,431 B2
(45) Date of Patent: Dec. 29, 2015

(54) TOUCH-SENSITIVE DISPLAY WITH DEPRESSION DETECTION AND METHOD

(75) Inventor: Nigel Patrick Pemberton-Pigott, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 1214 days.

(21) Appl. No.: 12/884,630

(22) Filed: Sep. 17, 2010

(65) Prior Publication Data
US 2012/0068970 A1 Mar. 22, 2012

(51) Int. Cl.
G06F 3/042 (2006.01)
G06F 3/041 (2006.01)
G06F 3/01 (2006.01)

(52) U.S. Cl.
CPC ............ G06F 3/0416 (2013.01); G06F 3/016 (2013.01); G06F 2203/04105 (2013.01)

(58) Field of Classification Search
CPC . G06F 3/0484; G06F 3/04842; G06F 3/0488; G06F 17/30442
USPC ................................. 345/173–179
See application file for complete search history.

(56) References Cited

U.S. PATENT DOCUMENTS

| | | |
|---|---|---|
| 3,410,956 A | 11/1968 | Grossimon et al. |
| 3,673,327 A | 6/1972 | Johnson et al. |
| 4,198,623 A | 4/1980 | Misek et al. |
| 4,281,245 A | 7/1981 | Brogardh et al. |
| 4,346,376 A | 8/1982 | Mallos |
| 4,484,179 A | 11/1984 | Kasday |
| 4,553,842 A | 11/1985 | Griffin |
| 4,593,191 A | 6/1986 | Alles |
| 4,599,908 A | 7/1986 | Sheridan et al. |
| 4,607,158 A | 8/1986 | Ovren |
| 4,609,816 A | 9/1986 | Severin |
| 4,701,614 A | 10/1987 | Jaeger et al. |
| 4,710,760 A | 12/1987 | Kaskay |
| 4,717,253 A | 1/1988 | Pratt |
| 4,733,068 A | 3/1988 | Thiele et al. |
| 4,880,972 A | 11/1989 | Brogardh et al. |
| 4,885,663 A | 12/1989 | Parker |
| 4,915,473 A | 4/1990 | Haese et al. |
| 4,933,544 A * | 6/1990 | Tamaru .................. 250/221 |
| 4,963,859 A | 10/1990 | Parks |

(Continued)

FOREIGN PATENT DOCUMENTS

| | | |
|---|---|---|
| DE | 102007042693 | 3/2009 |
| EP | 0377549 | 3/1990 |

(Continued)

OTHER PUBLICATIONS

EPO, "Extended Search Report," issued in connection with counterpart EP Application No. 10177449.5, mailed on Feb. 23, 2011, 10 pages.

(Continued)

*Primary Examiner* — Kent Chang
*Assistant Examiner* — Scott Au
(74) *Attorney, Agent, or Firm* — Fish & Richardson P.C.

(57) ABSTRACT

A device includes a touch-sensitive display and a sensor configured to detect a force that results in depression of the touch-sensitive display. The sensor includes one or more wavelength selective optical carriers that carry optical signals. The force affects one or more optical paths of the optical signals.

23 Claims, 7 Drawing Sheets

(56) References Cited

U.S. PATENT DOCUMENTS

| | | | |
|---|---|---|---|
| 5,001,306 A | 3/1991 | Purcell | |
| 5,004,913 A | 4/1991 | Kleinerman | |
| 5,118,931 A | 6/1992 | Udd et al. | |
| 5,153,386 A | 10/1992 | Siefer et al. | |
| 5,222,810 A | 6/1993 | Kleinerman | |
| 5,363,463 A | 11/1994 | Kleinerman | |
| 5,399,854 A | 3/1995 | Dunphy et al. | |
| 5,812,251 A | 9/1998 | Manesh | |
| 5,914,709 A | 6/1999 | Graham et al. | |
| 6,137,573 A | 10/2000 | Luke et al. | |
| 6,172,665 B1 | 1/2001 | Bullister | |
| 6,172,667 B1 | 1/2001 | Sayag | |
| 6,492,979 B1 | 12/2002 | Kent et al. | |
| 6,504,530 B1 | 1/2003 | Wilson et al. | |
| 6,538,644 B1 | 3/2003 | Muraoka | |
| 6,788,295 B1 | 9/2004 | Inkster | |
| 6,927,384 B2 | 8/2005 | Reime et al. | |
| 7,027,672 B2 | 4/2006 | Tjin | |
| 7,202,856 B2 | 4/2007 | Cok | |
| 7,202,860 B2 | 4/2007 | Ogawa | |
| 7,230,608 B2 | 6/2007 | Cok | |
| 7,333,094 B2 | 2/2008 | Lieberman et al. | |
| 7,376,523 B2 | 5/2008 | Sullivan et al. | |
| 7,444,887 B2 | 11/2008 | Yoshida et al. | |
| 7,466,879 B2 | 12/2008 | Tjin | |
| 7,479,903 B2 | 1/2009 | Otsuka et al. | |
| 7,586,479 B2 | 9/2009 | Park et al. | |
| 7,705,824 B2 * | 4/2010 | Baucom et al. | 345/107 |
| 8,102,378 B2 | 1/2012 | Chung et al. | |
| 8,224,258 B2 | 7/2012 | Jeon et al. | |
| 8,284,164 B2 | 10/2012 | Han | |
| 8,384,693 B2 | 2/2013 | Newton | |
| 2003/0026971 A1 | 2/2003 | Inkster et al. | |
| 2003/0079549 A1 | 5/2003 | Lokhorst et al. | |
| 2004/0233158 A1 | 11/2004 | Stavely et al. | |
| 2007/0025805 A1 | 2/2007 | Lapstun et al. | |
| 2007/0288194 A1 | 12/2007 | Boillot | |
| 2008/0007542 A1 * | 1/2008 | Eliasson et al. | 345/176 |
| 2008/0018612 A1 | 1/2008 | Nakamura et al. | |
| 2008/0055494 A1 | 3/2008 | Cernasov | |
| 2008/0121442 A1 | 5/2008 | Boer et al. | |
| 2008/0252618 A1 | 10/2008 | Chung et al. | |
| 2008/0266273 A1 | 10/2008 | Slobodin et al. | |
| 2008/0278461 A1 | 11/2008 | Prat et al. | |
| 2008/0309632 A1 * | 12/2008 | Westerman et al. | 345/173 |
| 2009/0140989 A1 | 6/2009 | Ahlgren | |
| 2009/0237374 A1 | 9/2009 | Li et al. | |
| 2009/0244026 A1 | 10/2009 | Purdy et al. | |
| 2010/0093402 A1 | 4/2010 | Jeon et al. | |
| 2010/0103140 A1 * | 4/2010 | Hansson | 345/175 |
| 2010/0156844 A1 | 6/2010 | Paleczny et al. | |
| 2010/0188367 A1 * | 7/2010 | Nagafuji et al. | 345/175 |
| 2010/0197352 A1 | 8/2010 | Runstedler et al. | |
| 2010/0220245 A1 | 9/2010 | Yang | |
| 2010/0265188 A1 | 10/2010 | Chang et al. | |
| 2010/0271334 A1 | 10/2010 | Yuan | |
| 2010/0277431 A1 | 11/2010 | Klinghult | |
| 2010/0302210 A1 * | 12/2010 | Han et al. | 345/175 |
| 2011/0037721 A1 * | 2/2011 | Cranfill et al. | 345/174 |
| 2011/0037729 A1 | 2/2011 | Cho et al. | |
| 2011/0050617 A1 | 3/2011 | Murphy et al. | |
| 2011/0147973 A1 * | 6/2011 | Sung et al. | 264/40.5 |
| 2011/0179368 A1 | 7/2011 | King et al. | |
| 2011/0234535 A1 | 9/2011 | Hung et al. | |
| 2012/0068939 A1 | 3/2012 | Pemberton-Pigott | |
| 2012/0068971 A1 * | 3/2012 | Pemberton-Pigott | 345/175 |
| 2012/0071206 A1 * | 3/2012 | Pemberton-Pigott | 455/566 |
| 2012/0262408 A1 | 10/2012 | Pasquero et al. | |

FOREIGN PATENT DOCUMENTS

| | | | |
|---|---|---|---|
| EP | 0392897 | 10/1990 | |
| EP | 1610210 | 12/2005 | |
| EP | 2034287 | * 3/2009 | G01L 1/24 |
| EP | 2101251 | 9/2009 | |
| EP | 2105824 | 9/2009 | |
| EP | 2224325 | 9/2010 | |
| JP | 63184823 | 7/1988 | |
| JP | 09-237158 | 9/1997 | |
| KR | 102005117464 | 12/2005 | |
| WO | 9904234 | 1/1999 | |
| WO | 0073982 | 12/2000 | |
| WO | 2006133018 | 12/2006 | |
| WO | 2007129085 | 11/2007 | |
| WO | 2008101657 | 8/2008 | |
| WO | 2010049823 | 5/2010 | |
| WO | 2010055195 | 5/2010 | |

OTHER PUBLICATIONS

Giallorenzi, Thomas G. et al, "Optical Fiber Sensor Technology," IEEE Journal of Quantum Electronics, vol. QE-18, No. 4, Apr. 1982, 40 pages.

The United States Patent and Trademark Office, Office Action issued in connection with U.S. Appl. No. 12/884,611, dated Dec. 24, 2013, 39 pages.

Kreuzer, Manfred, Strain Measurement with Fiber Bragg Grating Sensors, HBM GmbH, http://www.hbm.com/fileadmin/mediapool/techarticles/2007/FBGS_StrainMeasurement_en.pdf, 2007, 9 pages.

Lau, K.S., et al., Force Measurement by Visibility Modulated Fiber Optic Sensor, Optics Info Base, Applied Optics, vol. 38, Issue 34, Dec. 1, 1999, 3 pages.

Liu, Yunqi, et al., Fiber-Bragg-grating force sensor based on a wavelength-switched self-seeeded Fabry-Pe'rot laser diode, Photonics Technology Letters, IEEE, vol. 17, Issue 2, Feb. 2005, 1 page.

Chenyang Technologies GMBH & Co. KG, Fiber Optic Bragg-Grating Sensors, http://www.chenyang-ism.com/Bragg-Grating.htm, retrieved from the internet on Jul. 21, 2009, 2 pages.

Bakalidis, G.N., et al., A Low-Cost Fiber Optic Force Sensor, IEEE Transactions on Instrumentation and Measurement, vol. 45, No. 1, Feb. 1996, 4 pages.

Nuckley, David J., et al., Development of a Fiber-Optic Force Sensing Glove to Provide Clinical Biomechanics Measurements, 2008, 2 pages.

International Searching Authority, International Search Report and Written Opinion issued in PCT/CA2011/001039, mailed on Dec. 19, 2011, 12 pages.

International Searching Authority, International Search Report and Written Opinion issued in PCT/CA2011/001040, mailed on Dec. 21, 2011, 9 pages.

EPO, "Extended Search Report," issued in connection with corresponding EP Application No. 10177455.2, mailed on Feb. 25, 2011, 12 pages.

Vartech Systems Inc., Industrial Displays and Computer Solutions, Internet article, http://www.vartechsystems.com/about/, retrieved from the internet on Jul. 21, 2009, 2 pages.

Walker, Geoff, Circular Polarizers in Resistive Touch Screens, Veritas et Visus, Aug. 2006, 5 pages.

J. Limeres et al., Analysis of a novel stress-sensing technique based on light scattering by an array of birefringent optical waveguides, Journal of Optics A: Pure and Applied Optics, Sep. 2003, 2 pages.

Next Window Optical Touch, NextWindow's Optical Touch Screen Technology, internet article, http://www.nextwindow.com/benefits/touchscreen_technology.html, copyright date 2008, 2 pages.

Dr. Rudiger Paschotta, Distance Measurements With Lasers, Encyclopedia of Lasers and Technology, Last Updated Jun. 22, 2009, Retrieved From [URL: http://www.rp-photonics.com/distance_measurements_with_lasers.html] on Jul. 21, 2009 , 3 pages.

Wikipedia, Laser Extensometer, Last Modified May 13, 2009, Retrieved From [URL: http://en.wikipedia.org/wiki/laser_extensometer] on Jul. 21, 2009, 1 page.

Shida K. Wang Xin, Optical Mouse Sensor for Detecting Height Variation and Translation of a Surface, Apr. 1, 2008, Industrial Technology Issue 21-24, 1 page.

Welcome to Metralight, Jul. 21, 2009, Retrieved From [URL: http://www.metralight.com ] on Jul. 21, 2009, 1 page.

(56) References Cited

OTHER PUBLICATIONS

Christopher et al., "Touch Screen with Combined Force and Position Sensing," IP.com Journal, IP.com Inc., Jun. 1, 1989, XP013027734, 2 pages.
Kreuzer, Manfred, "Strain Measurement with Fiber Bragg Grating Sensors," HBM GmbH, http://www.hbm.com/fileadmin/mediapool/techarticles/2007/FBGS_StrainMeasurement_en_pdf, 2007, 9 pages.
Hodges et al., "ThinSight: Versatile Multi-touch Sensing for Thin Form-factor Displays," Microsoft Research Cambridge, ACM UIST, Oct. 7-10, 2007, 10 pages.
European Patent Office, "Extended European Search Report," issued in connection with European patent application No. 081534611.2-2224, dated Jun. 5, 2008, 6 pages.
Korean Intellectual Property Office, "Office Action," issued in connection with Korean patent application No. 10-2009-0024398, dated Sep. 28, 2010, 10 pages.
Inside Blackberry, The Official BlackBerry Blog, "Inside the Trackpad: a Blackberry Science Lesson," Dec. 18, 2009, retrieved from the Internet on Dec. 29, 2010, 12 pages.
European Patent Office, "Extended European Search Report," issued in connection with European patent application No. 10177436.2-2224, dated Feb. 22, 2011, 9 pages.
European Patent Office, "Extended European Search Report," issued in connection with European patent application No. 10177446.1-2224, dated Feb. 22, 2011, 13 pages.
European Patent Office, "Partial European Search Report," issued in connection with European patent application No. 11162722.0-2224, dated Sep. 5, 2011, 7 pages.
International Searching Authority, "International Search Report and Written Opinion of the International Searching Authority," issued in connection with International patent application No. PCT/CA2011/001038, mailed Dec. 21, 2011, 11 pages.
European Patent Office, "Extended European Search Report," issued in connection with European patent application No. 11162722.0-2224, dated Dec. 23, 2011, 16 pages.
European Patent Office, "Communication Pursuant to Article 94(3) EPC," issued in connection with European patent application No. 11162722.0-2224, dated Nov. 5, 2012, 8 pages.
United States Patent and Trademark Office, "Non-Final Office Action," issued in connection with U.S. Appl. No. 13/087,984 on Dec. 19, 2012, 39 pages.
United States Patent and Trademark Office, "Final Office Action," issued in connection with U.S. Appl. No. 13/087,984 on Aug. 7, 2013, 35 pages.
United States Patent and Trademark Office, "Advisory Action," issued in connection with U.S. Appl. No. 13/087,984 on Oct. 23, 2013, 4 pages.
United States Patent and Trademark Office, "Non-Final Office Action," issued in connection with U.S. Appl. No. 12/884,936 on Feb. 13, 2014, 34 pages.
United States Patent and Trademark Office, "Non-Final Office Action," issued in connection with U.S. Appl. No. 12/884,942 on Feb. 19, 2014, 37 pages.
International Preliminary Report on Patentability in International Application No. PCT/CA2011/001039, dated Mar. 28, 2013, 8 pages.
International Preliminary Report on Patentability in International Application No. PCT/CA2011/001040, dated Mar. 28, 2013, 7 pages.
International Preliminary Report on Patentability in International Application No. PCT/CA2011/001038, dated Mar. 28, 2013, 9 pages.
Office Action in CA Application No. 2,811,445, dated Oct. 9, 2014, 8 pages.
Canadian Intellectual Property Office, "Office Action," issued in connection with CA Application No. 2,811,441, dated Jan. 15, 2015, 5 pages.
Office Action in CA Application No. 2,811,321, dated Oct. 9, 2014, 4 pages.
Office Action in CA Application No. 2,774,358, dated Nov. 21, 2013, 4 pages.
Communication pursuant to Article 94(3) EPC in EP Application No. 10177449.5, dated Sep. 3, 2014, 8 pages.
European Patent Office, "Communication Pursuant to Article 94(3) EPC," issued in connection with application No. EP 10177446.1, on Jun. 6, 2014, 7 pages.
European Patent Office, "Communication Pursuant to Article 94(3) EPC," issued in connection with application No. EP 10177436.2, on Jun. 6, 2014, 6 pages.
United States Patent and Trademark Office, "Final Office Action," issued in connection with U.S. Appl. No. 12/884,942, dated Sep. 11, 2014, 34 pages.
The United States Patent and Trademark Office, Office Action issued in connection with U.S. Appl. No. 12/884,611, dated Jul. 3, 2014, 22 pages.
The United States Patent and Trademark Office, Advisory Action issued in connection with U.S. Appl. No. 12/884,611, dated Sep. 17, 2014, 3 pages.
United States Patent and Trademark Office, Office Action, issued in connection with U.S. Appl. No. 12/884,936 on Aug. 25, 2014, 36 pages.
United States Patent and Trademark Office, Office Action issued in connection with U.S. Appl. No. 13/087,984 on Aug. 7, 2013, 35 pages.
United States Office Action in U.S. Appl. No. 12/884,936, dated Mar. 24, 2015, 14 pages.

\* cited by examiner

TOUCH-SENSITIVE DISPLAY WITH DEPRESSION DETECTION AND METHOD

FIELD OF TECHNOLOGY

The present disclosure relates to portable electronic devices including, but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

Figure 1:
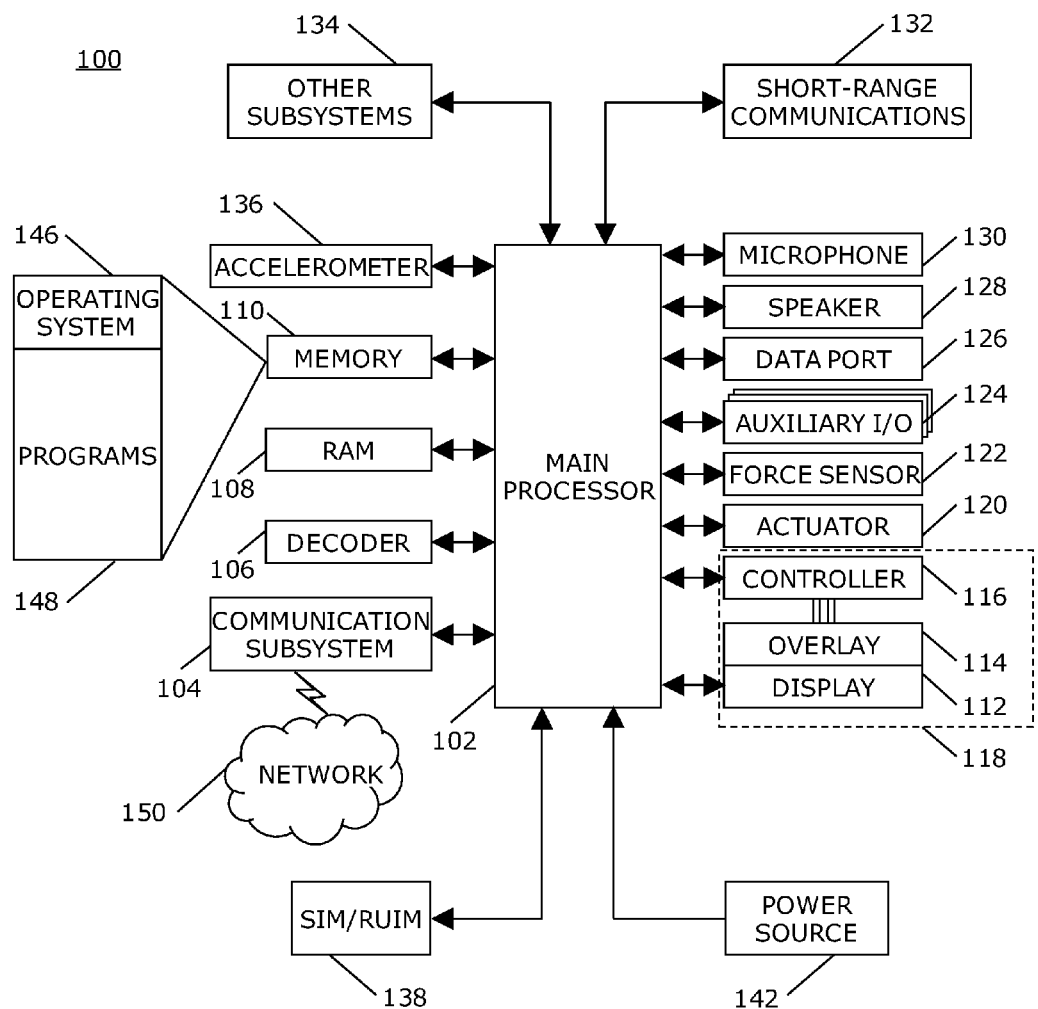
FIG. 1 is a block diagram of a portable electronic device in accordance with the disclosure.

The following describes apparatus for and method of detecting force exerted on, or depression of, a touch-sensitive display of, for example, a portable electronic device. When a sufficient or threshold force exerted on a movable touch-sensitive display of a portable electronic device is detected, a selection of a displayed selection options occurs.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The actuator(s) 120 may be depressed by applying sufficient force to the touch-sensitive display 118 to overcome the actuation force of the actuator 120. Force as utilized throughout the specification, including the claims, refers to force measurements, estimates, and/or calculations, such as pressure, deformation, stress, strain, force density, force-area relationships, thrust, torque, and other effects that include force or related quantities. The actuator 120 may be actuated by pressing anywhere on the touch-sensitive display 118. The actuator 120 may provide input to the processor 102 when actuated. Actuation of the actuator 120 may result in provision of tactile feedback. When force is applied, the touch-sensitive display 118 is depressible, pivotable, and/or movable. The actuator may be any suitable actuator, including mechanical and/or electrical actuators.

Figure 2:
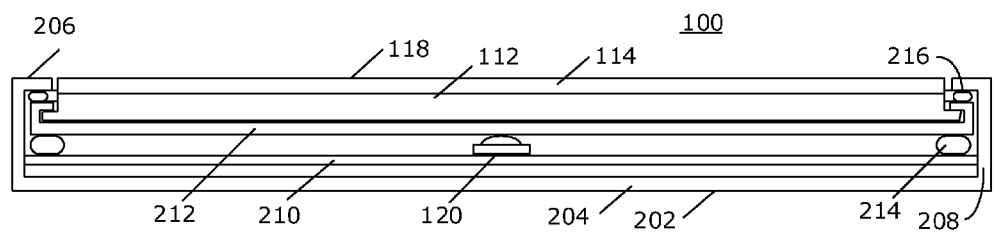
FIG. 2 is a sectional side view of a portable electronic device with a mechanical actuator in accordance with the disclosure.

A sectional side view of a portable electronic device 100 with a mechanical actuator 120 is shown in FIG. 2. The cross section is taken through the center of the actuator 120. The portable electronic device 100 includes a housing 202 that encloses components such as shown in FIG. 1. The housing 202 may include a back 204, a frame 206, and sidewalls 208 that extend between the back 204 and the frame 206. A base 210 extends between the sidewalls 208, generally parallel to the back 204, and supports the actuator 120. In the example of FIG. 2, a mechanical dome switch actuator is utilized. The touch-sensitive display 118 may be supported on a support tray 212 of suitable material, such as magnesium, and the support tray 212 may be biased away from the base 210 toward the frame 206 by biasing elements 214, such as gel pads or springs, between the support tray 212 and the base 210. Compliant or compressible spacers 216, which may be, for example, gel pads or springs, may be located between the support tray 212 and the frame 206.

Figure 3:
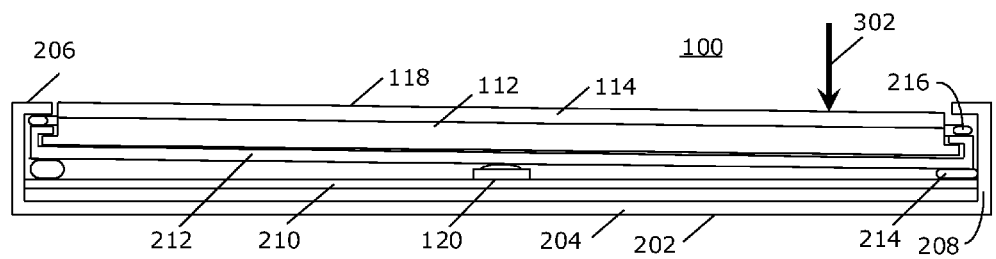
FIG. 3 is a sectional side view of a portable electronic device with a depressed mechanical actuator in accordance with the disclosure.

The touch-sensitive display 118 is moveable and depressible with respect to the housing 202, and in this example is shown floating with respect to the housing 202, i.e., not fastened to the housing 202. Alternatively, the touch-sensitive display 118 may be fastened to the housing 202 or base 210, provided the touch-sensitive display 118 is able to move relative to the housing 202 sufficient for measurement of optical signals described below. As the touch-sensitive display 118 is moved toward the base 210, the biasing elements 214 are compressed, and when sufficient force is applied, the actuator 120 is depressed or actuated as shown in FIG. 3. The touch-sensitive display 118 may also pivot within the housing to depress the actuator 120. A force 302 applied to one side of the touch-sensitive display 118 moves the display 118 toward the base 210, causing compression of the biasing elements 214 on that side of the touch-sensitive display 118 and depressing the actuator 120. The actuator 120 may be actuated by pressing anywhere on the touch-sensitive display 118. The processor 102 receives a signal when the actuator 120 is depressed or actuated, which signal may trigger a selection or other input to the portable electronic device 100. For a mechanical dome switch/actuator, tactile feedback is provided when the dome collapses due to imparted force and when the dome switch/actuator returns to the rest position after release of the switch. Although a single actuator is shown, any suitable number of actuators may be utilized and may be located in any suitable position(s).

Figure 4:
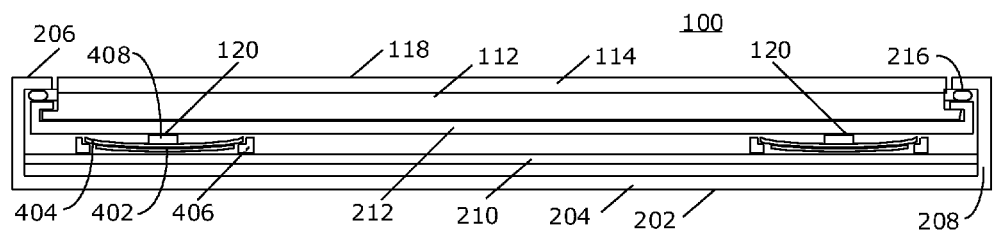
FIG. 4 is a sectional side view of a portable electronic device with piezoelectric actuators in accordance with the disclosure.

A sectional side view of a portable electronic device with piezoelectric (piezo) actuators is shown in FIG. 4. The actuator 120 may comprise one or more piezo devices 402 that provide tactile feedback for the touch-sensitive display 118. Four piezo devices 402 are utilized in this example, one disposed near each corner of the device 100. The cross-section of FIG. 4 is taken through the centers of two of the four piezo devices 402 utilized in this example. The piezo devices 402 may be disposed between the base 210 and the support tray 212. Each piezo actuator 120 includes a piezoelectric device, such as a piezoelectric ceramic disk 402 adhered to a substrate 404. The substrate 404 is elastically deformable, and may be comprised of metal, such that the substrate 404 bends when the piezo device 402 contracts, e.g., diametrically. The piezo device 402 may contract, for example, as a result of build-up of charge/voltage at the piezo device 402 or in response to a force, such as an external force applied to the touch-sensitive display 118. Each substrate 404 and piezo device 402 may be suspended from a support, such as a ring-shaped frame 406, for supporting the piezo device 402 while permitting flexing of the piezo actuator 120 as shown in FIG. 4. The support rings 406 may be disposed on the base 210 or may be part of the base 210, which may be a printed circuit board in a fixed relation to at least a part of the housing 202. Optionally, the substrate 404 may be mounted on a flat surface, such as the base 210. An element 408, which may be comprised of a suitable material such as a hard rubber, silicone, polyester, and/or polycarbonate, may be disposed between the piezo actuator 402 and the touch-sensitive display 118. This element 408 may provide a bumper or cushion for the piezo actuator 120 as well as facilitate actuation of the piezo actuator and/or one or more force sensors 122 that may be disposed between the piezo actuators 120 and the touch-sensitive display 118. The element 408 does not substantially affect the tactile feedback provided to the touch-sensitive display 118. As the touch-sensitive display 118 is moved toward the base 210, when sufficient force is applied, the actuator 120 of FIG. 4 is depressed or actuated. The processor 102 receives a signal when the actuator 120 is depressed or actuated, which signal may trigger a selection of a displayed selection option or other input to the portable electronic device 100.

Contraction of the piezo actuators 120 applies a spring-like force, for example, opposing a force externally applied to the touch-sensitive display 118 or providing tactile feedback in response to another event, such as an incoming call or other situation that results in provision of tactile feedback. The charge/voltage may be adjusted by varying the applied voltage or current, thereby controlling the force applied by the piezo devices 402. The charge/voltage across the piezo actuator 120 may be removed or reduced, for example, by a controlled discharge current that causes the piezo device 402 to expand, releasing or decreasing the force applied by the piezo device 402. The charge/voltage may advantageously be reduced over a relatively short period of time to provide tactile feedback to the user via the touch-sensitive display 118. Absent an external force and absent a charge/voltage across the piezo device 402, the piezo device 402 may be slightly bent due to a mechanical preload.

The processor 102, or a separate processor or controller, may be operably connected to one or more drivers that control the voltage/current/charge across the piezo devices 402, which controls the force applied by the piezo actuators 120 on the touch-sensitive display 118. Each of the piezoelectric devices 402 may be controlled substantially equally and concurrently. Optionally, the piezoelectric devices 402 may be controlled separately. The piezo actuators 120 may be controlled to impart a force on the touch-sensitive display as tactile feedback, for example, to simulate collapse or release of a dome switch. The piezo actuators 120 may be controlled to provide other tactile feedback, for example, a vibration to notify of an incoming call or text message. A depression sensor 501, which may be an optical depression sensor, comprising one or more optical devices as described below may alternatively or additionally provide the signal that triggers selection of a displayed selection option or other input to the electronic device 100, and may optionally trigger provision of tactile feedback by the piezo actuators 120.

Force information related to a detected touch on the touch-sensitive display 118 may be utilized to highlight or select information, such as information associated with a location of a touch, e.g., displayed selection options. For example, a touch that does not meet a force threshold may highlight a selection option shown on the touch-sensitive display 118, whereas a touch that meets a force threshold may select or input that selection option. Meeting the force threshold also includes exceeding the force threshold. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming. When a force imparted or exerted on the touch-sensitive display 118 moves the touch-sensitive display 118 or creates a threshold amount of distortion, e.g., bending or flexing, of the display, depression is detected. The depression results in selection, also referred to as confirmation of selection, of a selection option displayed on the touch-sensitive display 118. Tactile feedback by an actuator 120, or other mechanism may be provided to indicate selection.

When a force that meets the force threshold is imparted or exerted on the touch-sensitive display 118, depression occurs. A force that meets the force threshold equals or exceeds the force threshold. Depression of the touch-sensitive display 118 signifies selection, also referred to as confirmation of selection, of a selection option displayed on the touch-sensitive display 118. The selection option is typically associated with a touch location. Tactile feedback by an actuator 120 or other mechanism, visual feedback, audible feedback, and/or other feedback may optionally be provided to indicate selection, which feedback may be triggered by the depression. Indication of selection of a selection option includes any visible, audible, or other indicator that selection has occurred, such as entry of a character in a data field, performance of a function such as playing a song on a music player, opening of an application, sending an email, and so forth. Utilizing a force threshold reduces the occurrence of unintended selection, for example, due to inadvertent, careless, or erroneous touches. The force threshold, for example, addresses any force imparted on the touch-sensitive display 118 that overcomes any biasing force, compression force, moves the display an established distance, and/or any other force on the touch-sensitive display 118 prior to depression of the touch-sensitive display 118. For example, the force threshold may be established to overcome at least the biasing forces and/or the force to actuate the actuator 120 of FIG. 3. Alternatively, the force may be a force utilized in conjunction with the piezo actuator 120 of FIG. 4. The force or other action that depresses the touch-sensitive display may be detected by the actuator 120, such as described in various embodiments above, or by another type of sensor, such as the optical depression sensor described herein. Thus, the optical depression sensor acts as a force sensor. Detection of a force that results in depression of the touch-sensitive display 118 may be established based on movement, compression, or flexing of the touch-sensitive display 118 that causes an identifiable effect on an optical signal. The effect may relate to phase, amplitude, reflection including a reflection characteristic, and/or any other characteristic of the optical signal and/or any change in phase, amplitude, reflection including a reflection characteristic, and/or any other characteristic of the optical signal. The optical depression sensor is configured to detect the effect. The depression sensors of any figure may be a form of actuator 120 and/or force sensor 122.

Figure 5:
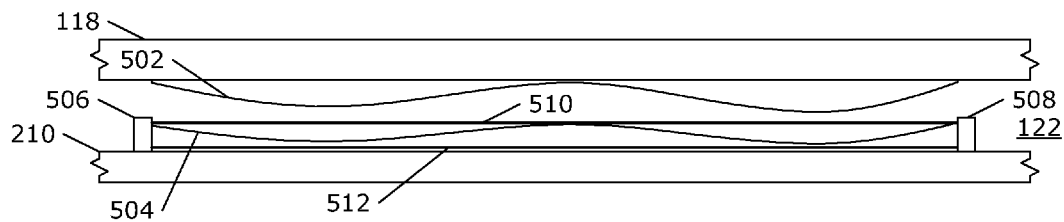
FIG. 5 is a sectional side view of a portable electronic device when a touch-sensitive display is not depressed in accordance with the disclosure.
Figure 6:
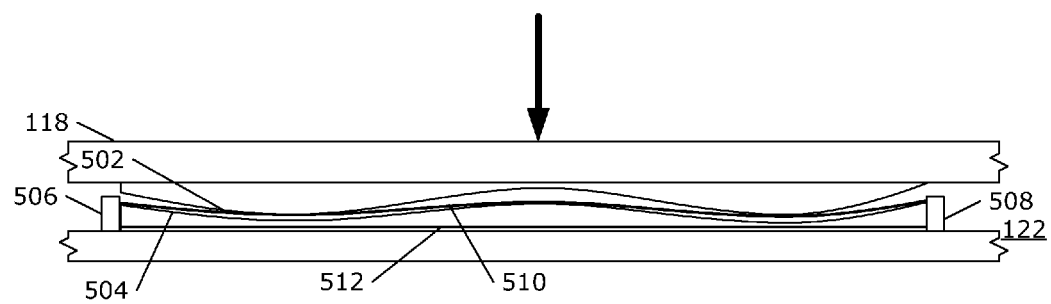
FIG. 6 is a side view of a portable electronic device when a touch-sensitive display is depressed in accordance with the disclosure.

As shown in the cross-sectional views in the example of FIG. 5 and FIG. 6, a depression sensor 501 includes a deflector 502 that is attached to or part of the touch-sensitive display 118 and a mating deflector 504 attached to or part of another component of the portable electronic device, such as the base 210 or housing 202. The depression sensor 501 includes an optical emitter 506 that is coupled to an optical detector 508. The optical emitters may include optical components such as semiconductor emitters, laser or infra-red emitters, fiber optic couplers, and so forth. An optical carrier 510 provides an optical path through which optical signals are carried or transmitted. The optical carrier 510 comprises, for example, air, an optical fiber, an optical waveguide, or other suitable optical material. The optical carrier 510 may be wavelength selective material, such as a fiber Bragg grating optical fiber. The optical carrier 510 is located between, and, in some cases, stretched between the optical emitter 506 and the optical detector 508. Although only one optical emitter 506 and one optical detector 508 are shown in FIG. 5 and FIG. 6, several optical emitters 506 and optical detectors 508 may be utilized. The depression sensor 501 may replace the mechanical actuator 120 of FIG. 2 or the piezo actuators 120 of FIG. 4. Alternatively, the mechanical actuator 120 of FIG. 2 or the piezo actuators 120 of FIG. 4 may be utilized in addition to the depression sensor 501 of FIG. 5.

As the touch-sensitive display 118 moves toward the base 210, the biasing elements between the touch-sensitive display 118 and the base 210 are compressed due to the force exerted on the touch-sensitive display 118. The biasing elements for the arrangement of FIG. 5 may be disposed in the same locations and operate in a similar manner as the biasing elements 214 of FIG. 2. The biasing elements may be actuators, such as mechanical switches, gel pads, springs, and so forth, and provide an opposing force to depression of the touch-sensitive display 118.

Figure 10:
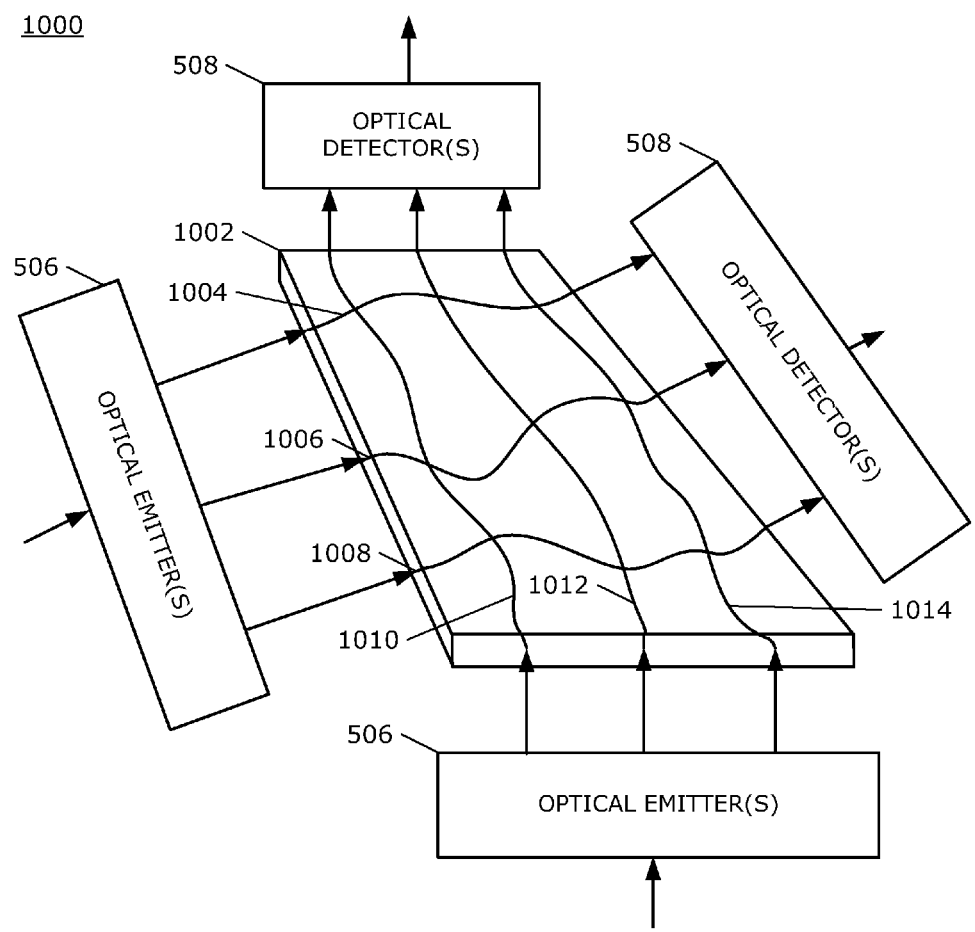
FIG. 10 is a diagram showing an optical depression sensing arrangement including optical carriers in accordance with the disclosure.
Figure 11:
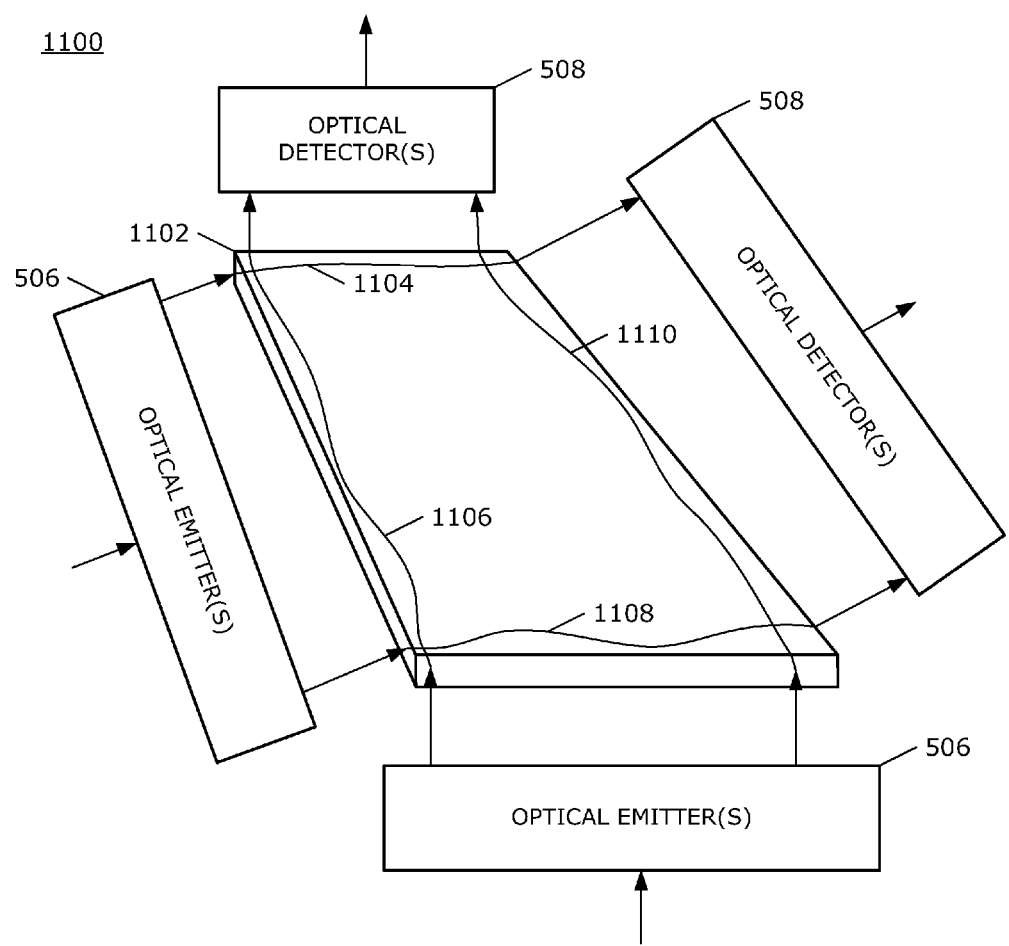
FIG. 11 is a diagram showing an optical depression sensing arrangement with optical carriers disposed near an outer perimeter of an optical medium in accordance with the disclosure.

As shown in FIG. 5, when the touch-sensitive display 118 is not depressed, the optical carrier 510 is substantially a straight line between the optical emitter 506 and the optical detector 508. The optical carrier 510 has a length, L, that is effectively the distance from the optical emitter 506 to the optical detector 508 when the touch-sensitive display is not depressed. When the touch-sensitive display 118 is depressed, for example, due to a force represented by the arrow in FIG. 6, the distance between the deflectors 502, 504 shortens, thereby affecting the optical carrier 510 such that the optical path through the optical carrier 510 changes from a path directly between the optical emitter 506 and the optical detector 508 to a longer optical path having a length of L+x, where x represents added length to the optical path due to the force or depression. For example, when the optical carrier 510 is air, the deflectors 502, 504 prevent a direct path of light from the optical emitter 506 to the optical detector 508, effectively increasing the length of the optical path through the optical carrier 510 to infinity. Alternatively, the light from the optical emitter 506 may deflected between the deflectors 502, 504 such that the optical path is affected is a measurable way. A tangible optical medium, such as one or more optical fibers, or other physical medium, may be extended between the optical emitter 506 and the optical detector 508 to serve as the optical carrier 510. Bringing the deflectors 502, 504 together causes the optical path(s) in the tangible optical carrier 510 to lengthen. In the case of an optical fiber, as the fiber meets the contours of the deflectors 502, 504, the optical fiber stretches, and the optical path is extended by the change in length. When a planar optical medium extends between the optical emitter 506 and the optical detector 508, such as shown in FIG. 10 or FIG. 11, the deflectors 502, 504 deform or move the optical carriers within this optical medium, causing the paths through the optical carriers to increase in length. When a planar optical medium extends between the optical emitter 506 and the optical detector 508 and does not include discrete optical carriers, optical propagation through the planar material is affected by the deflection. A reference optical carrier 512 extends between the optical emitter 506 and the optical detector 508. The reference optical carrier 512 is not affected by depression of the touch-sensitive display 118. The length of a reference optical carrier 512 between the optical emitter 506 and the optical detector 508 stays the same whether or not the touch-sensitive display 118 is depressed.

The difference between the optical signals transmitted through the optical carrier 510 and the reference optical carrier 512 is utilized to determine whether force exerted on the touch-sensitive display 118 meets a threshold, or whether the touch-sensitive display 118 is depressed. The difference between the optical signals may be a phase difference, which may be measured by a time between signal peaks or amplitude difference, which may be partially or totally reduced. For example, when an optical path is lengthened due to changes in the optical carrier in which the optical path is located, the time for an optical signal to pass through the lengthened optical path changes the phase of an optical signal that is sinusoidal. The difference between the optical signals may be an energy value such as an amplitude difference. For example, when an optical path is changed, causing the deflection of the light in the optical path to reflect in a manner that causes optical signals from the optical path to be diffused or absorbed, for example, in surrounding media, the energy or amplitude of the optical signal changes. The difference between the optical signals may be wavelength differences. For example, when an optical path is changed, the path change may cause the wavelength of the energy passing through the optical path to change. The optical signal may comprise one or more pulses of one or more different durations, and a time difference in receipt of a pulse of the optical signal through the optical path of the optical carrier 510 and an optical signal through the reference optical path in a reference optical carrier 512 may be detected when the touch-sensitive display 118 is depressed.

Although the deflectors 502, 504 are shown as substantially mating curved shapes in FIG. 5 and FIG. 6, other shapes may be utilized. For example, a rounded saw-tooth shape may be utilized. Alternatively, the deflectors 502, 504 may not have mating shapes. A deflector may be any structure that affects an optical carrier or an optical path in a detectable manner. Optionally, one deflector may be utilized instead of two deflectors. Either deflector 502, 504 may be utilized. A single deflector arrangement is more successfully implemented when the deflector and the optical emitters 506 are not attached to the same surface, i.e., when depression of the touch-sensitive display 118 brings the deflector into the optical path and/or otherwise changes the optical path in a detectable manner. Depression of the touch-sensitive display may cause the optical path to be broken, which break is interpreted as a selection. Alternatively, depression of the touch-sensitive display 118 may cause the optical path to lengthen, e.g., due to stretching or deformation of the optical carrier.

Although the optical carrier 510 of FIG. 5 and FIG. 6 extends between the optical emitter 506 and the optical detector 508, other arrangements are possible. For example, the optical carriers may be laid out in a non-linear arrangement between an optical emitter and an optical detector, such as shown in FIG. 10 and FIG. 11. Example non-linear arrangements may include slightly curved, curved, tortuous arrangements, and so forth. The optical carriers may comprise any arrangement that is affected by movement of the touch-sensitive display 118 enough for the optical signals to be affected in a manner that is detectable.

Figure 7:
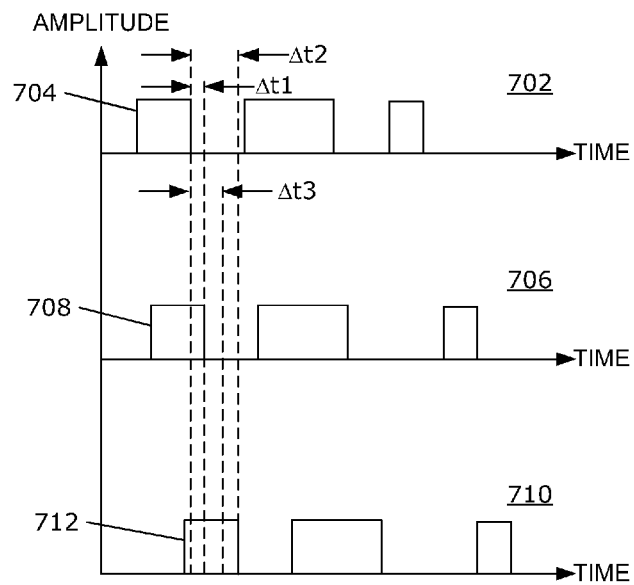
FIG. 7 illustrates relative timing of optical signals passing through different optical paths in accordance with the disclosure.

Signals at the optical detector(s) 508 are shown in FIG. 7. The optical emitter 506 directs one or more pulses of light along the optical carrier 510 and the reference optical carrier 512. The optical signals from the optical carrier 510 and the reference optical carrier 512 are received by one or more detectors 508 that may, for example, convert the optical signal from each of the carriers 510, 512 into signals such as electrical signals that are provided to a processor for evaluation or analysis. The upper signal 702 is an optical signal from the reference optical carrier 512. The upper signal 702 includes three pulses of different durations, one pulse 704 is utilized for reference in the following example. Other types or durations of pulses may be utilized. The falling edge of the pulse 704 is a time reference from which one or more correlated pulses from the optical carrier 510 are measured. Correlated pulses may be two or more pulses having a same or similar shape, pulse width, relative position in a pulse train, and/or any other common feature. A comparison of signals may be utilized to identify the correlated pulses. Alternatively, measurements may be triggered off the rising edge or other aspect of the pulse 704.

The middle signal 706 is an optical signal from the optical carrier 510 when the touch-sensitive display 118 is not depressed. A falling edge of a pulse 708, which is correlated with the pulse 704, in the signal 706 occurs at a time that is $\Delta t1$ in time later than the falling edge of the pulse 704 of the reference (upper) signal 702.

When the touch-sensitive display 118 is depressed, the optical path through the optical carrier 510 changes, resulting in the lower optical signal 710. A falling edge of a pulse 712 of the signal 710 occurs at a time that is $\Delta t2$ in time after the falling edge of the pulse 704 of the upper signal 702. A comparison between signals, time or phase difference, or distortion between signals from the reference optical carrier 512 and the optical carrier 510 may be utilized to determine whether the touch-sensitive display 118 is depressed. In this example, the time change between corresponding points of the reference optical signal and non-reference optical signal may be utilized to determine when the touch-sensitive display is depressed. For example, a threshold of $\Delta t3$ may be specified at a point in time beyond $\Delta t1$, such that the threshold of $\Delta t3$ corresponds to a distortion or delay signifying depression. When a corresponding point of a non-reference signal is delayed or distorted more than $\Delta t3$, the touch-sensitive display is determined to be depressed. The threshold $\Delta t3$ may be adaptable or changeable over time to provide consistent detection of depression.

Figure 8:
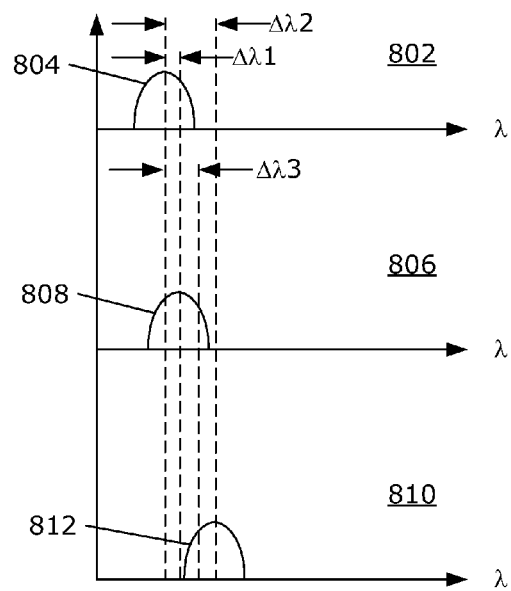
FIG. 8 illustrates relative wavelengths of optical signals passing through different optical paths in accordance with the disclosure.

In the example of FIG. 8, the optical emitter(s) 506 emit signals or energy at a number of different wavelengths, and the optical detector(s) 508 detect energy at a number of different wavelengths. A frequency selective optical carrier, such as a fiber Bragg grating, may be utilized to determine changes in the optical energy as signals pass through the optical carrier 510. One of the changes that may occur is a change in the frequency or wavelength of signals that may be passed through the fiber of the optical carrier 510 when the touch-sensitive display 118 is depressed. This change in the frequency or wavelength of optical signals that can be passed by the fiber of the optical carrier 510 is referred to as a change in the selectivity of the optical carrier 510. The changes in the frequency or wavelength of signals that may be passed through the fiber of the optical carrier 510 result in a change in the wavelength of energy at the detector(s) 508. Signals at the optical detector(s) 508 are shown in FIG. 8. The optical emitter 506 directs one or more pulses of light along the optical carrier 510 and the reference optical carrier 512. The optical signals from the optical carrier 510 and the reference optical carrier 512 are received by one or more detectors 508 that may, for example, convert the optical signal from each of the carriers 510, 512 into signals such as electrical signals that are provided to a processor for evaluation or analysis. The upper signal 802 is an optical signal from the reference optical carrier 512. The upper signal 802 includes one pulse 804 centered at a wavelength that is a wavelength reference from which one or more correlated pulses from the optical carrier 510 are measured. Correlated pulses may be two or more pulses having a same or similar shape, pulse width, relative position in a pulse train, and/or any other common feature. A comparison of signals to the signal on the reference optical carrier may be utilized to identify the correlated pulses.

The middle signal 806 is an optical signal from the optical carrier 510 when the touch-sensitive display 118 is not depressed. A pulse 808 in the signal 806 is correlated with the reference pulse 804 and is centered at a wavelength that is $\Delta\lambda1$ longer than the wavelength of the pulse 804.

When the touch-sensitive display 118 is depressed, the optical path through the optical carrier 510 changes, resulting in the lower optical signal 810 having a pulse 812. In this example, the optical carrier 510 is a fiber Bragg grating having a frequency or wavelength selectivity that changes when the touch-sensitive display 118 is depressed. Thus, the wavelength of the optical energy or signal exiting the optical carrier 510 changes from the signal that entered the optical carrier 510. The pulse 812 of the signal 810 is centered at a wavelength that is $\Delta\lambda2$ higher than the wavelength of the pulse 804. The wavelength difference between signals may be considered a distortion. The wavelength difference or distortion between signals from the reference optical carrier 512 and the optical carrier 510, e.g., the center wavelengths of a pulse, may be utilized to determine whether the touch-sensitive display 118 is depressed. In this example, the wavelength change between the reference optical signal and non-reference optical signal may be utilized to determine when the touch-sensitive display 118 is depressed. For example, a threshold of $\Delta\lambda3$ may be specified at a wavelength beyond $\Delta\lambda1$, such that the threshold of $\Delta\lambda3$ corresponds to a distortion or wavelength change signifying depression. When a wavelength of a non-reference signal is changed or distorted more than $\Delta\lambda3$, the touch-sensitive display 118 is determined to be depressed. The threshold $\Delta\lambda3$ may be modified over time to provide consistent detection of depression, e.g., as the device 100 changes, for example, due to age or other factors. Although in this example a depression of the touch-sensitive display 118 increases wavelength, depression of the touch-sensitive display 118 may decrease the wavelength of the optical energy or signal. Upper and lower thresholds may be utilized in such an embodiment, rather than simply an upper threshold.

Figure 9:
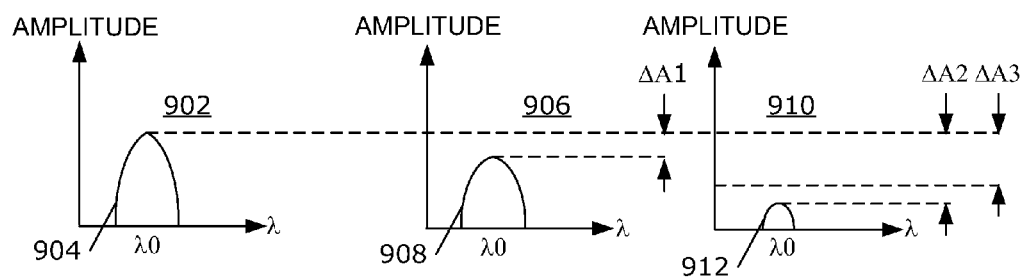
FIG. 9 illustrates relative amplitudes of optical signals passing through different optical paths in accordance with the disclosure.

In the example of FIG. 9, the optical emitter(s) 506 emit signals or energy in a narrow range of wavelengths, and the optical detector(s) 508 are detect energy in that narrow wavelength range. A wavelength or frequency selective optical carrier, such as a fiber Bragg grating, matching the narrow wavelength of the optical detector(s) 508 and the optical emitter(s) 506 may be utilized to determine changes in the optical energy as signals pass through the optical carrier 510. One of the changes that may occur is a change in the wavelength selectivity of the fiber when the touch-sensitive display 118 is depressed. The wavelengths of the optical detector(s) 508, the optical carrier, and the optical emitter(s) 506 are matched such that a change in the wavelength selectivity of the optical carrier results in a reduction of energy detected at the optical detector(s) 508 because the optical carrier has changed the wavelength of the energy that passes at the predetermined wavelength. The further the wavelength selectivity changes from matching the wavelength of the optical signals output from the optical emitter(s) 506 due to depression, the smaller the amplitude of wavelength from the optical emitter(s) 506 that passes to the optical detector(s) 508. Thus, the amplitude of the signal at the wavelength output from the optical emitter(s) 506 may be compared to a threshold to detect when depression has occurred. Signals at the optical detector(s) 908 are shown in FIG. 9. The optical emitter 506 directs one or more pulses of light along or through the optical carrier 510 and the reference optical carrier 512. The optical signals from the optical carrier 510 and the reference optical carrier 512 are received by one or more detectors 508 that may, for example, convert the optical signal from each of the carriers 510, 512 into signals such as electrical signals that are provided to a processor for evaluation or analysis. The left signal 902 is an optical signal from the reference optical carrier 512. The left signal 902 includes one pulse 904 centered at a wavelength λ0 and having an amplitude that is a reference from which one or more correlated pulses from the optical carrier 510 are measured. Correlated pulses may be two or more pulses having a same or similar shape, pulse width, relative position in a pulse train, wavelength, and/or any other common feature. A comparison of signals may be utilized to identify the correlated pulses among the signals.

The middle signal 906 is an optical signal output from the optical carrier 510 when the touch-sensitive display 118 is not depressed. A pulse 908 in the signal 906 is correlated with the pulse 904 has an amplitude ΔA1 lower than the amplitude of the pulse 904.

When the touch-sensitive display 118 is depressed, the optical path through the optical carrier 510 changes, resulting in the optical signal 910 shown on the right. In this example, the optical carrier 510 is a fiber Bragg grating having a frequency or wavelength selectivity that changes when the touch-sensitive display is depressed. Thus, the wavelength selectivity of the optical carrier 510 changes, which results in a change of the amplitude of a pulse 912 of the signal 910. The amplitude of the pulse 912 is ΔA2 lower than the amplitude of the pulse 904 of the reference signal 902. The amplitude difference or distortion between signals from the reference optical carrier 512 and the optical carrier 510 may be utilized to determine whether the touch-sensitive display 118 is depressed. In this example, the amplitude change between the reference optical signal and non-reference optical signal may be utilized to determine when the touch-sensitive display 118 is depressed. For example, a threshold of ΔA3 may be specified at an amplitude more than ΔA1 below the reference signal 902, such that the threshold of ΔA3 corresponds to an amplitude change signifying depression. When an amplitude of a non-reference signal is changed or distorted more than ΔA3 below the reference signal 902, the touch-sensitive display 118 is determined to be depressed. The threshold ΔA3 may be modified in general or over time to provide consistent detection of depression, e.g., as the device 100 changes, for example, due to age or other factors.

While the pulses 804, 808, 812, 904, 908, and 910 are shown as being generally parabolic-shaped, this is merely an example used to show pulses and is not necessarily representative of the wavelength distribution of the pulses.

Although the examples of FIG. 5 and FIG. 6 are shown including one optical carrier 510, one optical emitter 506 and one optical detector 508, other numbers of optical carriers, optical emitters, and optical detectors may be utilized. For example, FIG. 10 shows an example of a depression sensing arrangement 1000 including a material 1002 that may be substantially planar. For example, the material 1002 may be shaped as a rectangular prism. A plurality of optical carriers 1004, 1006, 1008, 1010, 1012, 1014, each providing an optical path, are integrated or disposed in the material 1002. The material 1002 may be substantially transparent or translucent. Alternatively, the material 1002 may be opaque. For example, the material 1002 may comprise polypropylene, polyurethane, or any other suitable material that may be compressed a large number of times.

The optical carriers may be discrete optical fibers that comprise any suitable fiber optic material, for example, silica, such as glass or plastic, such as transparent polymers, e.g., polymethylmethacrylate (PPMA), polystyrene, and so forth. The optical fibers may comprise frequency selective materials, such as material including gratings (e.g., fiber Bragg gratings). Alternatively, the optical carriers may be integrated into a substrate using any suitable optical processing technique. As shown in FIG. 10, the optical carriers 1004, 1006, 1008, 1010, 1012, 1014 are arranged in a crossing pattern and are laid out in non-linear paths. The example of FIG. 10 includes multiple optical emitters 506 and multiple optical detectors 508. The optical emitters 506 and the optical detectors 508 are optically coupled to one or more of the optical paths of the optical carriers 1004, 1006, 1008, 1010, 1012, 1014. The outputs of the detectors 508 are provided to a processor, such as the processor 102.

The depression sensing arrangement 1000 may be disposed between the deflectors 502, 504 of FIG. 5 and FIG. 6. When the material 1002 is compressed due to force imparted on the touch-sensitive display 118, the variations that may occur in the optical signals may include, but are not limited to, phase variations, amplitude variations, and so forth. The variations may be measured with respect to a reference optical carrier, such as the reference optical carrier 512. Alternatively, the variations may be measured relative to the optical carriers themselves. For example, one optical path may be monitored for changes in the amplitude of the optical signal. Variations may also be measured relative to an aggregate or combination of the optical carriers. The touch-sensitive display 118 is determined to be depressed when the variation meets a threshold associated with a force that moves the touch-sensitive display 118 sufficiently to select a selection option.

Another depression sensing arrangement 1100 is shown in the example of FIG. 11 and includes a material 1102 in which multiple optical carriers 1104, 1106, 1108, 1110 are integrated. Optical emitters 506 and optical detectors 508 are optically coupled to the optical carriers 1104, 1106, 1108, 1110. The material 1102 comprises of similar materials as the material 1002 of FIG. 10. Likewise, the optical carriers 1104, 1106, 1108, 1110 may be comprised of similar materials as the optical carriers of FIG. 10.

Although the depression sensing arrangement 1100 of FIG. 11 may be disposed between the deflectors 502, 504 of FIG. 5 and FIG. 6, the depression sensing arrangement 1100 of FIG. 11 may be disposed in the touch-sensitive display 118, e.g., between the overlay 114 and the display 112, because the optical paths are disposed near an outer periphery of the material 1102, which outer periphery may be disposed outside the available display area of the touch-sensitive display 118. The material 1102 may be substantially transparent or translucent such that the optical carriers 1104, 1106, 1108, 1110 do not obscure or affect the ability to view information displayed on the touch-sensitive display 118. Optical signals may be analyzed and interpreted as described above.

The thresholds related to variations for an optical path may be modified over longer periods of time to adjust for changes in the optical carrier over time, e.g., weeks, months, or years.

The depression sensor of FIG. 5, FIG. 10, or FIG. 11 may be disposed, for example, between the touch-sensitive display 118 and the base 210. The depression sensor 501 may be disposed between other components of the portable electronic device 100. For example, the depression sensor 501 may be disposed between the display 112 and the support tray 212, between the overlay 114 and the display 112, or in any other suitable location.

Figure 12:
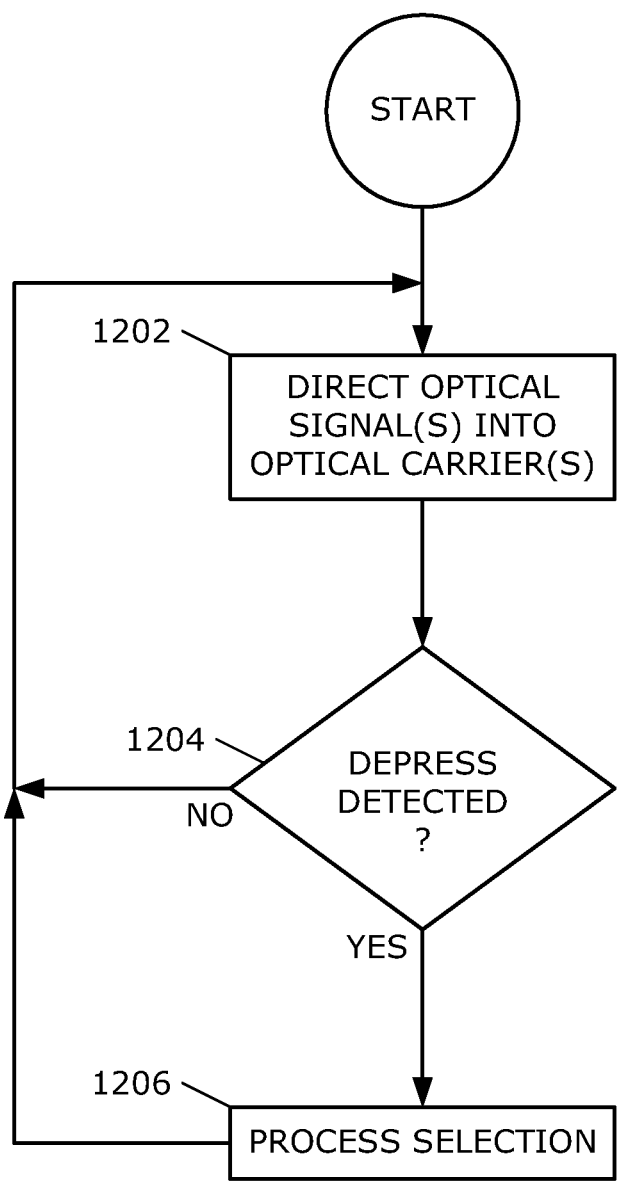
FIG. 12 is a flowchart illustrating methods related to detecting force on, or depression of, the touch-sensitive display in accordance with the disclosure.

A flowchart illustrating a method of detecting force exerted on, or depression of, a touch-sensitive display of a mobile device is shown in FIG. 12. The method may be carried out by software executed by, for example, the processor 102. Coding of software for carrying out such a method is within the scope of a person of ordinary skill in the art given the present description. The method may contain additional or fewer processes than shown and/or described and may be performed in a different order. Computer-readable code executable by at least one processor of the portable electronic device to perform the method may be stored in a computer-readable medium.

In one example, one or more optical signals are directed 1202 into one or more optical carriers 1202. The one or more optical emitters and one or more of the optical emitters 506 may be enabled while the portable electronic device is enabled or activated when the portable electronic device 100 is powered up or when selection options are displayed to save energy. The optical emitters 506 direct the optical signals into the optical carriers, e.g., the optical carriers shown in FIG. 5, FIG. 6, FIG. 10, or FIG. 11.

The optical signal(s) propagate though the optical carrier (s) along optical paths to one or more optical detectors. The optical signals are evaluated or analyzed to determine whether the touch-sensitive display is depressed 1204. The evaluation of the optical signals may be carried out after the optical signals are converted from optical signals into other signals that are more easily evaluated, such as electrical signals, by one or more optical detectors 508. The evaluation may be carried out by a processor or other suitable logic device configured to process electrical signals. The optical signals may be evaluated in a number of different ways to determine whether depression of the touch-sensitive display is detected 1204.

One manner in which determining that a depression is detected 1204 includes conducting baseline measurements of the optical signals and comparing the optical signals to the baseline measurements. Baseline measurements may be carried out periodically, such that an optical signal at the optical detector is compared to corresponding attributes, such as time, phase, amplitude, and so forth, of a relevant baseline measurement. The baseline measurements may be composite measurements, wherein one baseline is determined for multiple optical carriers. For example, one baseline measurement may be representative of the average optical energy in several optical carriers. Alternatively, each optical carrier may have its own baseline, such as an representation of the average optical energy in that optical carrier. Optical signal deviations from the baseline are representative of a depression when the deviations meet a threshold, such as an amplitude, time, phase, or other threshold. Exceeding the threshold is also considered meeting the threshold. For example, when an amplitude of optical energy in an optical carrier is sufficiently larger or smaller than the average optical energy in that carrier, e.g., a baseline measurement, depression has occurred that affects the optical energy in the carrier. Baseline measurements may be conducted over time at regular intervals, e.g., every 10 milliseconds, and so forth, or may be carried out upon the occurrence of particular event, e.g., mobile unit power up and so forth.

Another manner for detecting a depression 1204 includes comparing a reference optical signal from a reference carrier to an optical signal from another carrier. The differences between the reference optical signal and the optical signal are utilized to determine whether a threshold is met. As described in the examples of FIG. 7, FIG. 8, and FIG. 9, force exerted on the touch-sensitive display causes the optical carrier 510 to change thereby altering the optical path through the optical carrier 510. This alteration changes the phase, amplitude, wavelength, or timing of optical signals carried by the optical carrier 510. The reference optical carrier 512 is not affected by the force. Thus, when a threshold is met after a comparison between optical signals from the optical path and optical signals, depression is detected. The comparison may be a phase comparison, an amplitude comparison, a wavelength comparison, or any other suitable comparison of signal characteristics. The threshold may be a phase difference and amplitude difference, or the difference of any other signal attribute that changes when force exerted on the movable touch-sensitive display 118 affects the optical carriers 510. From the example of FIG. 7, the threshold may be $\Delta t3$, which is met when a delay between an optical signal and a reference optical signal is greater than or equal to $\Delta t3$.

When a depression is detected 1204, the selection option associated with the location of the touch is processed 1206, and the process continues at 1202.

Through the use of one or more techniques described herein, depression of a movable touch-sensitive display may be detected without the use of strain gauges or other mechanical techniques. The optical techniques described herein have thin implementations and facilitate reduced overall device size. The use of optical techniques does not require components to be physically attached to the touch-sensitive display to detect depression. The use of optical technology over strain gauges and other technology facilitates the depression detection system to be more resistant to liquid and corrosion than other depression detection systems, such as electronic detection systems. The example approaches described have relatively wide tolerance ranges and high manufacturing yield. User experience with the portable electronic device is enhanced, e.g., by more reliable selection and tactile feedback. Because the techniques described utilize a difference between signals, accounting for loss of transmission or reduced light transmittance as the user device ages is not necessary.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A device comprising:
    a touch-sensitive display, the touch-sensitive display configured to move substantially a same distance as a whole in response to a force exerted on the touch-sensitive display; and
    a sensor configured to detect the force that results in depression of the touch-sensitive display, wherein the sensor includes one or more optical carriers that carry optical signals and one or more reference optical carriers that carriers reference optical signals, wherein the force is to affect one or more optical paths of the optical signals and one or more optical paths of the reference optical signals are substantially unaffected by the force.

2. The device of claim 1, wherein the sensor comprises a plurality of wavelength selective optical carriers.

3. The device of claim 2, wherein the plurality of wavelength selective optical carriers comprises one or more Bragg grating optical fibers.

4. The device of claim 1, wherein the sensor comprises a plurality of optical earners.

5. The device of claim 4, wherein the plurality of optical carriers are arranged in a non-linear path.

6. The device of claim 4, wherein at least two of the optical carriers cross one another.

7. The device of claim 1, wherein the sensor comprises one or more optical fibers.

8. The device of claim 1, wherein the sensor comprises a substantially planar material in which the optical carriers are integrated.

9. The device of claim 1, wherein the sensor comprises an optical fiber and a reference optical fiber, wherein the reference optical fiber carries a reference optical signal that is substantially unaffected by the force.

10. The device of claim 1, wherein the force affects one or more of the optical signals by changing a phase of one or more of the optical signals.

11. The device of claim 1, wherein the force lengthens one or more of the optical paths.

12. The device of claim 1, wherein the sensor further comprises one or more deflectors that affect one or more of the optical paths.

13. The device of claim 1, wherein the sensor further comprises one or more deflectors that deflect one or more of the optical carriers in response to the force.

14. The device of claim 1, wherein the sensor is disposed near the touch-sensitive display.

15. The device of claim 1, wherein the touch-sensitive display is depressible.

16. The device of claim 1, wherein the sensor is disposed between a display and an overlay of the touch-sensitive display.

17. An electronic device comprising:
   a touch-sensitive display and a base, the touch-sensitive display being non-flexible in response to a force exerted on the touch-sensitive display;
   a first deflector coupled to the base; a second deflector coupled to the touch-sensitive display, the second deflector to move or deflect toward the first deflector when a force is exerted on the touch-sensitive display;
   a sensor comprising a plurality of optical carriers that carry optical signals along an optical path and at least one reference optical carrier that carries reference optical signals that is substantially unaffected by the force, wherein the force exerted on the touch-sensitive display is to cause the second deflector to move toward the first deflector to affect at least one of the optical signals carried along the optical path;
   an optical emitter arranged to direct optical signals into the optical carriers;
   an optical detector arranged to receive optical signals from the optical carriers and to convert the received optical signals into electrical signals; and
   a processor configured to receive the electrical signals and to detect variations in the electrical signals signifying the force exerted on the touch-sensitive display.

18. The electronic device of claim 17, wherein the processor is configured to indicate selection of a selection option when variations in the electrical signals meet a threshold.

19. The electronic device of claim 17, wherein the touch-sensitive display configured to move as a whole in response to a force exerted on the touch-sensitive display.

20. The electronic device of claim 17, further comprising a reference optical emitter arranged to direct the reference optical signals into the at least one reference optical carrier, wherein the at least one reference optical carrier is not affected when force is exerted on the touch-sensitive display and the second deflector moves toward the first deflector.

21. A method comprising:
   directing an optical signal into an optical carrier that is affected when a force is exerted on a rigid touch-sensitive display;
   directing a reference optical signal through a reference optical carrier that is not affected when force is exerted on the touch-sensitive display;
   identifying a difference between the optical signal and the reference optical signal;
   determining that the identified difference meets a threshold; and
   in response to the determining, signifying the force imparted on the touch-sensitive display.

22. The method of claim 21, wherein the optical carrier and the reference optical carrier comprise wavelength selective optical carriers.

23. The method of claim 21, wherein comparing the optical signal to the reference signal comprises a comparison that is made over time.

* * * * *

UNITED STATES PATENT AND TRADEMARK OFFICE
CERTIFICATE OF CORRECTION

PATENT NO. : 9,223,431 B2
APPLICATION NO. : 12/884630
DATED : December 29, 2015
INVENTOR(S) : Nigel Patrick Pemberton-Pigott It is certified that error appears in the above-identified patent and that said Letters Patent is hereby corrected as shown below:

In the Claims

In Column 15, Line 1, In Claim 1, delete "carriers" and insert -- carry --, therefor.

In Column 15, Line 11, In Claim 4, delete "earners." and insert -- carriers. --, therefor.

Signed and Sealed this
Twenty-sixth Day of April, 2016

Michelle K. Lee
*Director of the United States Patent and Trademark Office*